(12) United States Patent
Koetje

(10) Patent No.: US 10,000,156 B2
(45) Date of Patent: Jun. 19, 2018

(54) VEHICLE MIRROR MOUNT ASSEMBLY

(71) Applicant: MAGNA MIRRORS OF AMERICA, INC., Holland, MI (US)

(72) Inventor: Christopher R. Koetje, Zeeland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 89 days.

(21) Appl. No.: 15/170,967

(22) Filed: Jun. 2, 2016

(65) Prior Publication Data

US 2016/0355135 A1    Dec. 8, 2016

Related U.S. Application Data

(60) Provisional application No. 62/169,786, filed on Jun. 2, 2015.

(51) Int. Cl.
    *B60R 1/04*    (2006.01)
(52) U.S. Cl.
    CPC ..................... *B60R 1/04* (2013.01)
(58) Field of Classification Search
    CPC .............................................. B60R 1/04
    See application file for complete search history.

(56) References Cited

U.S. PATENT DOCUMENTS

| | | | |
|---|---|---|---|
| 6,087,953 A | 7/2000 | DeLine et al. | |
| 6,124,886 A | 9/2000 | DeLine et al. | |
| 6,172,613 B1 | 1/2001 | DeLine et al. | |
| 6,243,003 B1 | 6/2001 | DeLine et al. | |
| 6,250,148 B1 | 6/2001 | Lynam | |
| 6,278,377 B1 | 8/2001 | DeLine et al. | |
| 6,326,613 B1 | 12/2001 | Heslin et al. | |
| 6,329,925 B1 | 12/2001 | Skiver et al. | |
| 6,341,523 B2 | 1/2002 | Lynam | |
| 6,420,975 B1 | 7/2002 | DeLine et al. | |
| 6,428,172 B1 | 8/2002 | Hutzel et al. | |
| 6,445,287 B1 | 9/2002 | Schofield et al. | |
| 6,501,387 B2 | 12/2002 | Skiver et al. | |
| 6,593,565 B2 | 7/2003 | Heslin et al. | |
| 6,690,268 B2 | 2/2004 | Schofield et al. | |
| 6,774,356 B2 | 8/2004 | Heslin | |
| 6,824,281 B2 | 11/2004 | Schofield et al. | |
| 6,968,736 B2 | 11/2005 | Lynam | |
| 7,004,593 B2 | 2/2006 | Weller et al. | |

(Continued)

*Primary Examiner* — Kimberly N Kakalec
(74) *Attorney, Agent, or Firm* — Honigman Miller Schwartz and Cohn, LLP

(57) ABSTRACT

An interior rearview mirror assembly for a vehicle includes a mirror head, a mounting member and an attachment member. The mirror head includes a mirror casing and a reflective element. The mounting member includes an upper portion configured to mount at an interior structure of a vehicle. The attachment member includes a connection portion and a pivot element protruding from the connection portion. The attachment member is disposed at a lower portion of the mounting member. The mirror head is configured to adjustably attach at the pivot element. The mounting member is formed of a polymeric material, and at least the connection portion of the attachment member is formed of a metallic material. The connection portion of the attachment member may be insert molded in the lower portion of the mounting member.

16 Claims, 8 Drawing Sheets

(56) References Cited

U.S. PATENT DOCUMENTS

| | | |
|---|---|---|
| 7,262,406 B2 | 8/2007 | Heslin et al. |
| 7,265,342 B2 | 9/2007 | Heslin et al. |
| 7,289,037 B2 | 10/2007 | Uken et al. |
| 7,420,159 B2 | 9/2008 | Heslin et al. |
| 7,480,149 B2 | 1/2009 | DeWard et al. |
| 7,538,316 B2 | 5/2009 | Heslin et al. |
| 7,946,505 B2 | 5/2011 | Lynam et al. |
| 8,256,821 B2 | 9/2012 | Lawlor et al. |
| 8,451,332 B2 | 5/2013 | Rawlings |
| 8,534,887 B2 | 9/2013 | DeLine |
| 8,743,203 B2 | 6/2014 | Karner |
| 8,851,690 B2 | 10/2014 | Uken |
| 8,944,655 B2 | 2/2015 | Verrat-Debailleul |
| 9,150,165 B1 | 10/2015 | Fortin |
| 9,156,403 B2 | 10/2015 | Rawlings |
| 9,352,692 B2 | 5/2016 | Uken et al. |
| 9,596,387 B2 | 3/2017 | Achenbach et al. |
| 2006/0050018 A1 | 3/2006 | Hutzel et al. |
| 2009/0295181 A1 | 12/2009 | Lawlor et al. |
| 2011/0096427 A1* | 4/2011 | Uken ................ B60R 1/04 359/872 |
| 2013/0112836 A1* | 5/2013 | Rawlings ............ B60R 1/04 248/484 |
| 2014/0097320 A1* | 4/2014 | Rizk ................ F16M 11/14 248/475.1 |
| 2014/0226012 A1 | 8/2014 | Achenbach et al. |
| 2014/0313339 A1 | 10/2014 | Diessner |
| 2014/0340510 A1 | 11/2014 | Ihlenburg et al. |
| 2015/0015713 A1 | 1/2015 | Wang et al. |
| 2015/0251605 A1 | 9/2015 | Uken et al. |

\* cited by examiner

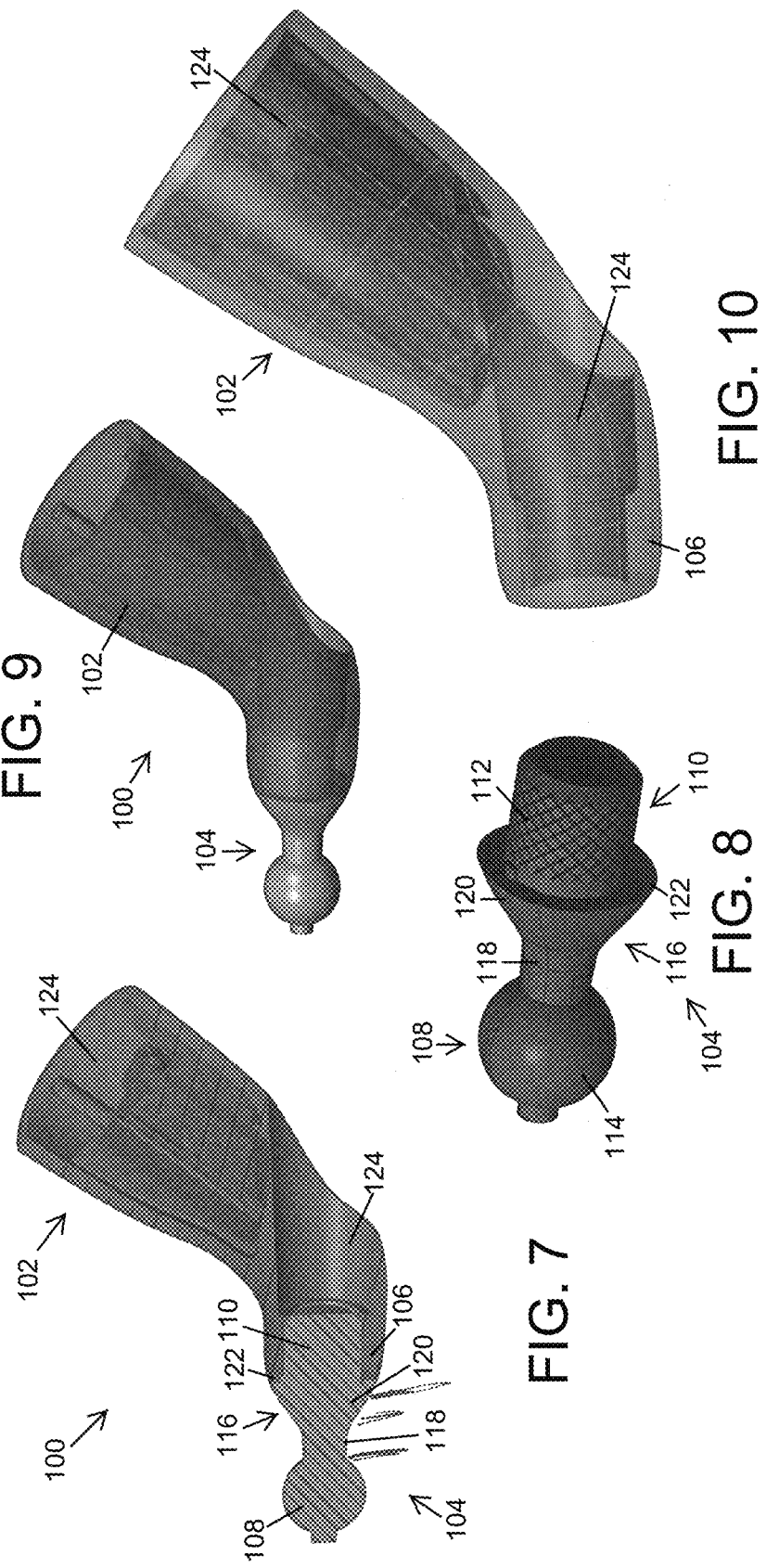

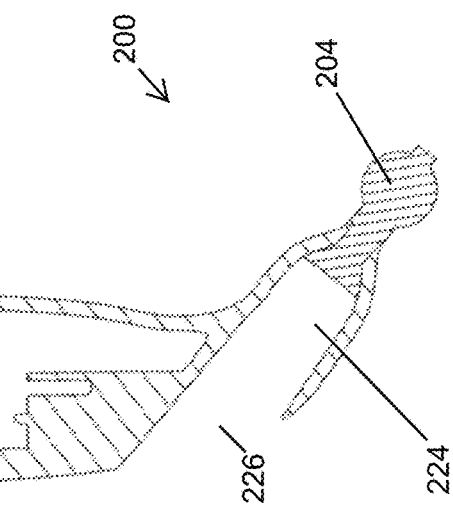
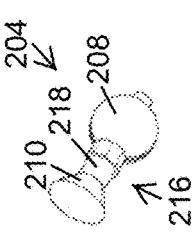
FIG. 12
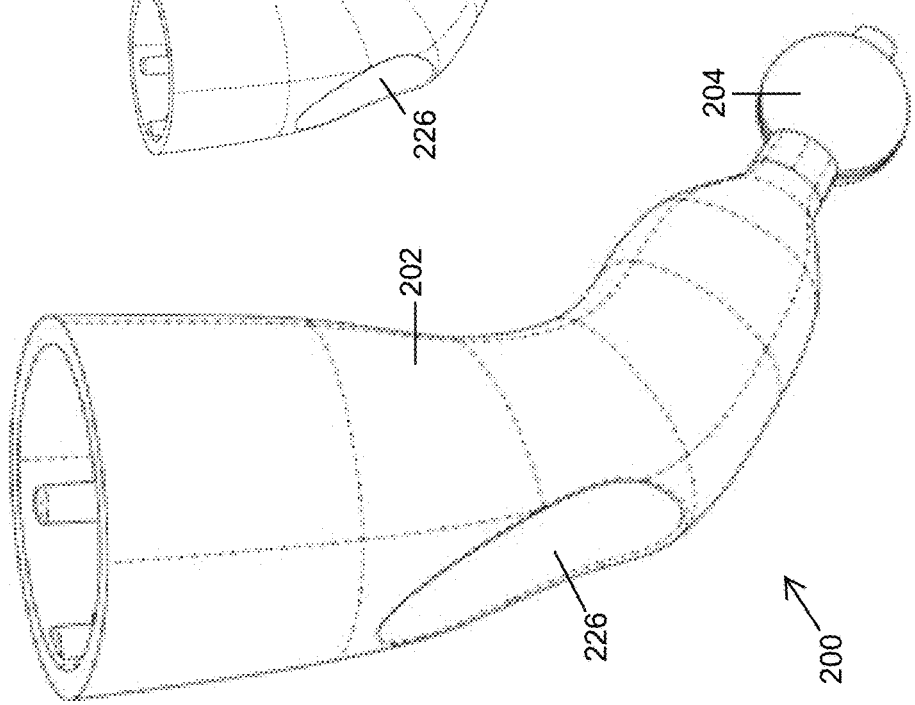

VEHICLE MIRROR MOUNT ASSEMBLY

CROSS REFERENCE TO RELATED APPLICATION

The present application claims the filing benefits of U.S. provisional application Ser. No. 62/169,786, filed Jun. 2, 2015, which is hereby incorporated herein by reference in its entirety.

FIELD OF THE INVENTION

The present invention relates to interior rearview mirror assemblies for vehicles and, more particularly, to mirror stays and mount assemblies that adjustably attach rearview mirrors to headers or windshields of vehicles.

BACKGROUND OF THE INVENTION

It is generally known to attach a mirror stay or mount to a vehicle header or windshield for pivotally supporting a rearview mirror. A lower end of the mirror stay or mount may provide an adjustment mechanism that allows for frictional adjustment at the pivotal connection with the mirror stay or mount.

SUMMARY OF THE INVENTION

The present invention provides an interior vehicle mirror stay or mount assembly that mounts a mirror or mirror assembly at a header or a front windshield of a vehicle. The mirror stay or mount assembly includes a mounting member that has an upper portion configured to connect or attach or mount at the header or an in-cabin surface of the windshield or other interior portion of the vehicle. A lower portion of the mirror mount extends or angles rearward from the upper portion and may be insert molded over a connection portion of an attachment member. The attachment member comprises a pivot element, such as a die cast metal ball member, for pivotally attaching at a mirror head (which includes a mirror casing and mirror reflective element), such as at a socket of the mirror head. The mounting member may be formed by injection molding a thermoplastic polymeric molding resin, which may include a reinforced polyamide polymeric molding resin.

Optionally, the connection portion of the attachment member may include a knurled or otherwise unsmooth surface that is overmolded by the lower portion of the mounting member to provide a substantially fixed connection therebetween. Optionally, the connection portion of the attachment member may include a conical shape or other shape that is angled to be overmolded by the lower end of the mounting member to limit or prevent rearward disengagement of the attachment member from the mounting member.

These and other objects, advantages, purposes and features of the present invention will become apparent upon review of the following specification in conjunction with the drawings.

BRIEF DESCRIPTION OF THE DRAWINGS

FIGS. 6 and 7 are cross-sectional views of the mirror mount assembly of FIG. 4;

FIG. 8 is a perspective view of an attachment member of the mirror mount assembly shown in FIG. 4;

FIG. 9 is a perspective view of the mirror mount assembly of FIG. 4;

FIG. 10 is a perspective view of a mounting member of the mirror mount assembly shown in FIG. 4;

FIG. 11 is a perspective view of another mirror mount assembly in accordance with the present invention;

FIG. 12 is an exploded perspective view of the mirror mount assembly of FIG. 11;

FIG. 13 is a cross-sectional view of the mirror mount assembly of FIG. 11; and

DESCRIPTION OF THE PREFERRED EMBODIMENTS

Figure 1:
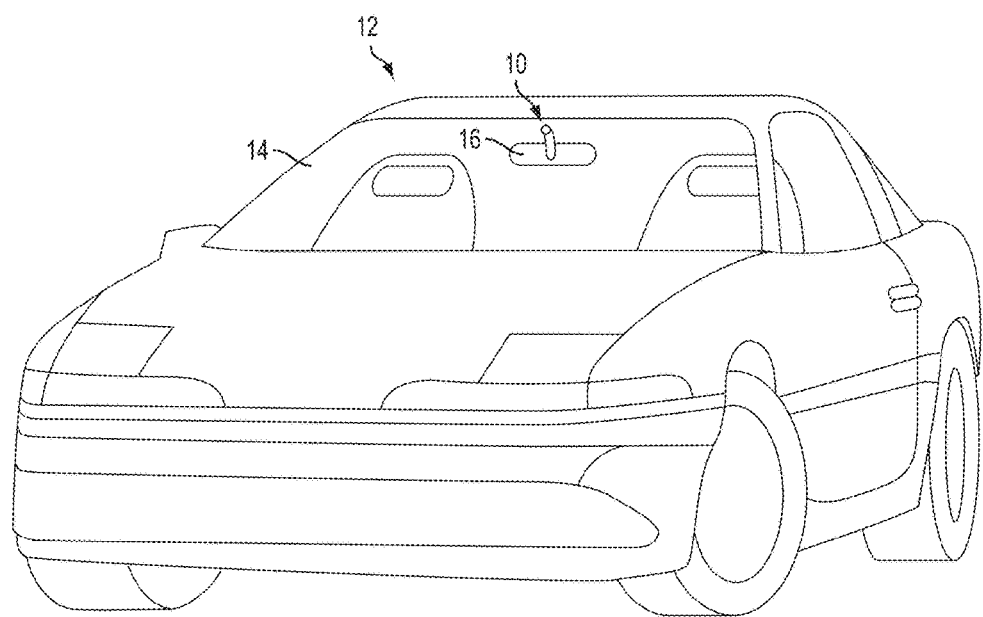
FIG. 1 is a perspective view of a vehicle having a mirror mount assembly in accordance with the present invention.
Figure 2:
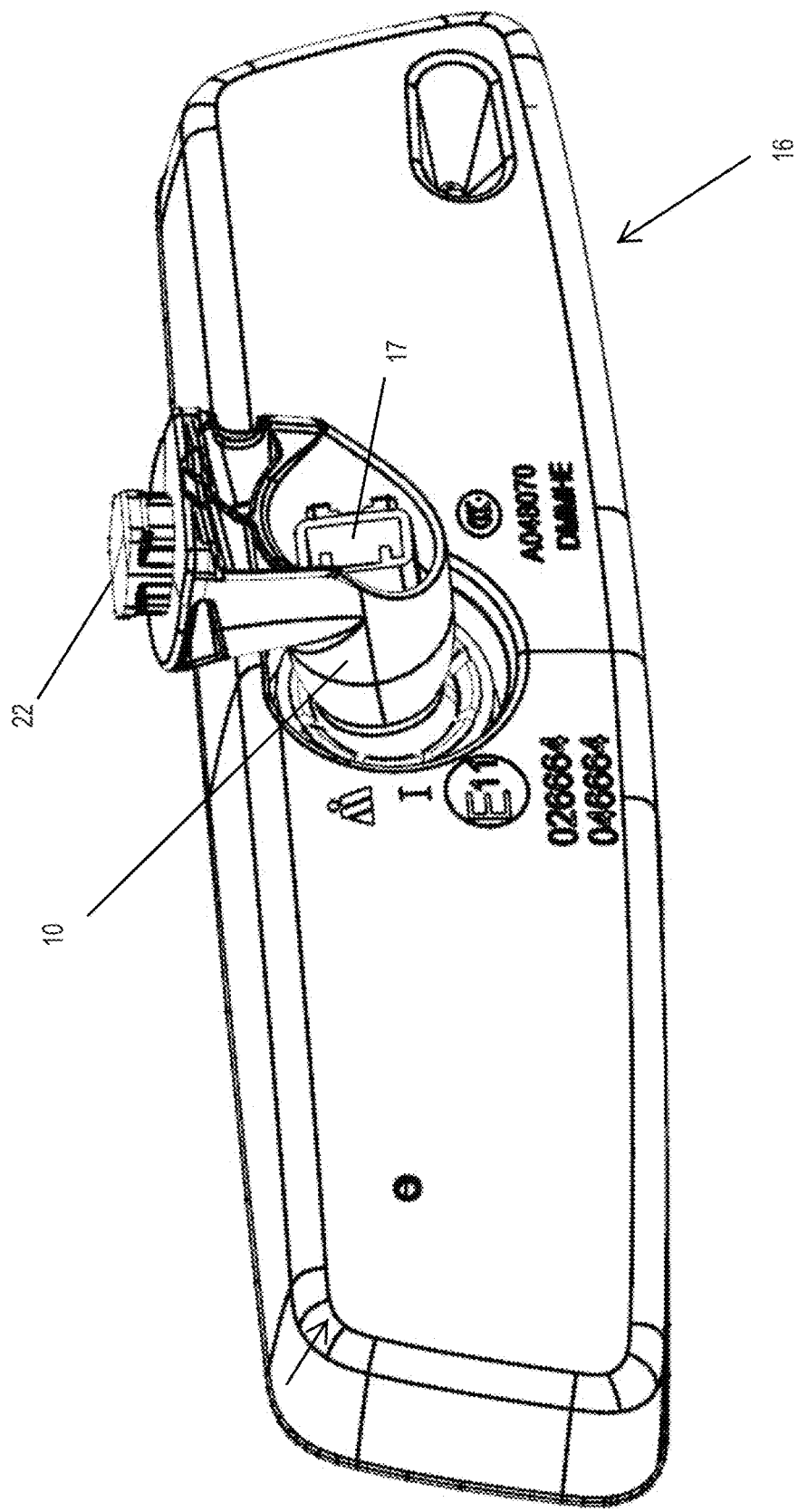
FIG. 2 is a perspective view of a mirror head and a mirror mount assembly, in accordance with the present invention.

A vehicle mirror stay or mount assembly can be used to attach a rearview mirror to an interior surface of a vehicle, such as a car, truck, bus, or van. Such an interior surface may be a header, an in-cabin surface of a vehicle windshield, or other appropriate mirror mounting surface or structure. As shown in FIG. 1, a vehicle mirror mount or mount assembly 10 is configured to attach a rearview mirror 16 to a vehicle 12 at a windshield 14 of the vehicle 12. As shown in FIG. 2, the rearview mirror head 16 (including a mirror reflective element and mirror casing and a pivot element or mounting element) is configured to attach to a vehicle and may include a camera module, a video display behind a reflective element of the rearview mirror, a user interface, an image processor operable to process image data captured by the camera or cameras, and other electrical mirror components that may conceivably be provided in or on the rearview mirror 16. Accordingly, the mirror mount or mount assembly 10 may be provided with an electrical connector 17 used to provide an electrical connection for such components, and further, the mirror mount 10 may be used for housing electrical wires that lead to the rearview mirror 16.

Figure 3:
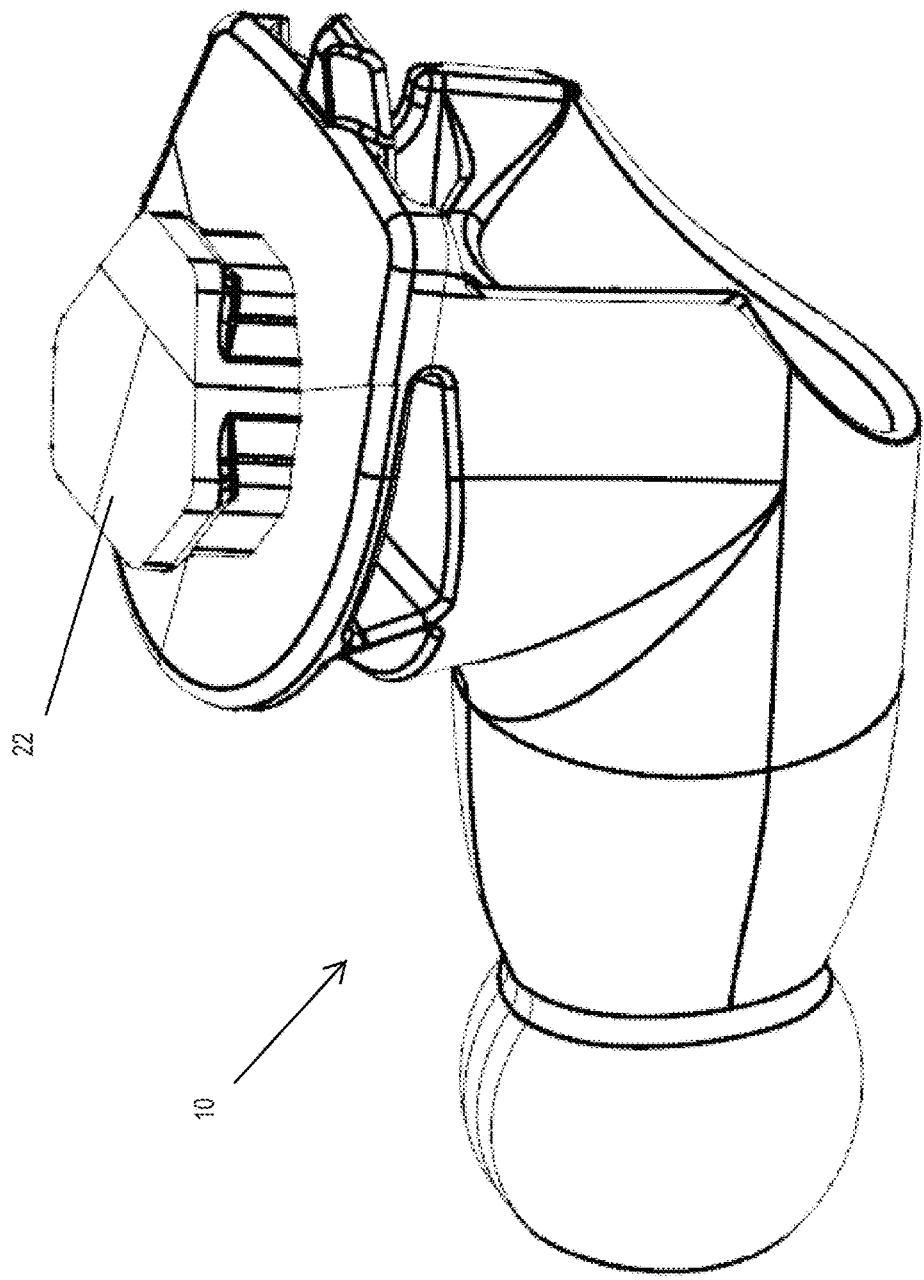
FIG. 3 is a perspective view of the mirror mount assembly shown in FIG. 2.
Figure 6:
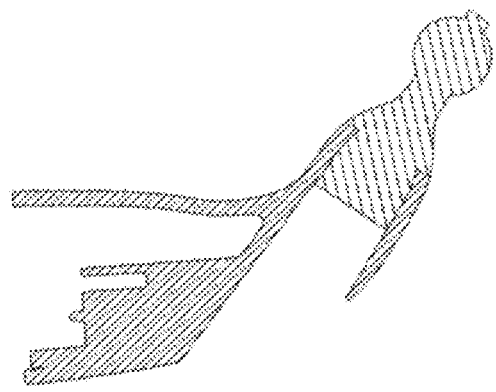
Figure 5:
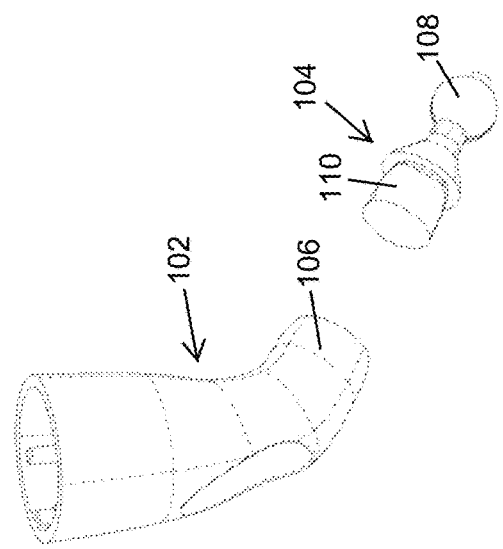
FIG. 5 is an exploded perspective view of the mirror mount assembly of FIG. 4.
Figure 4:
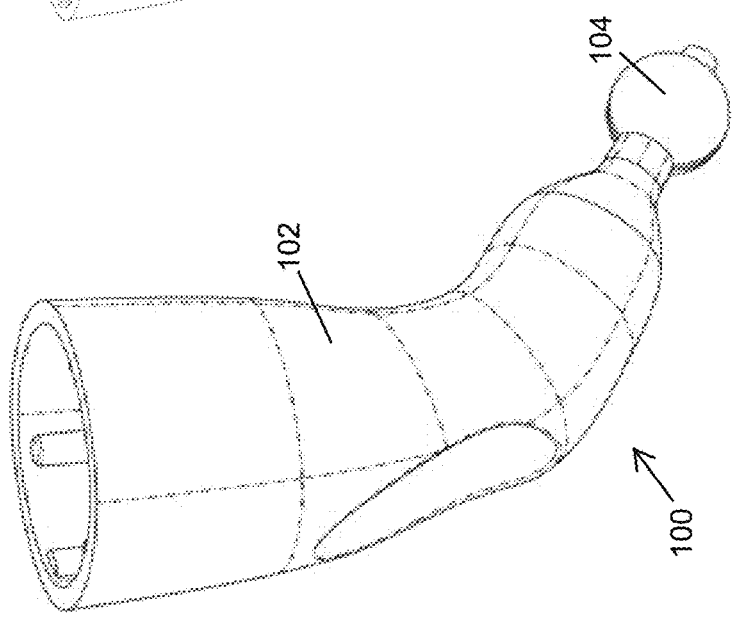
FIG. 4 is a perspective view of another mirror mount assembly in accordance with the present invention.
Figure 14:
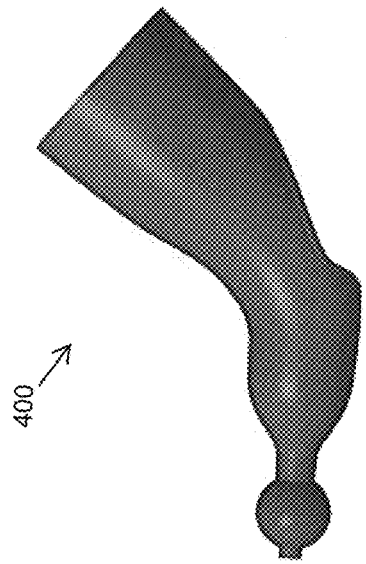
FIGS. 14-21 are perspective and cross-sectional views of other mirror mount assemblies in accordance with the present invention.
Figure 15:
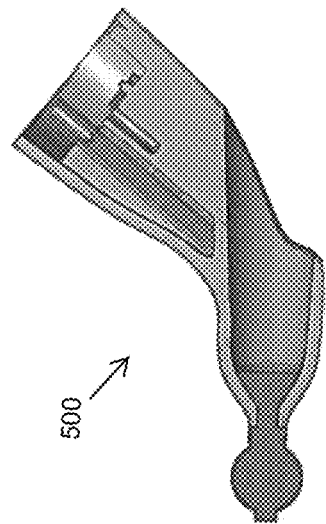
Figure 16:
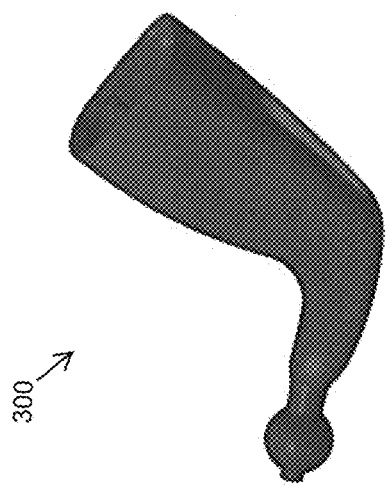
Figure 17:
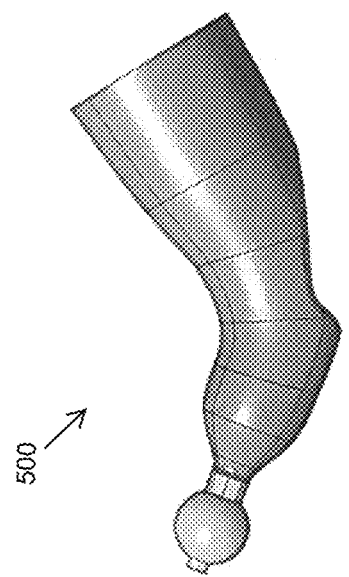
Figure 19:
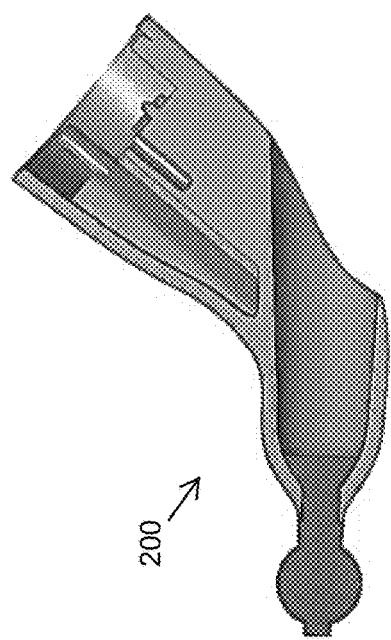
Figure 21:
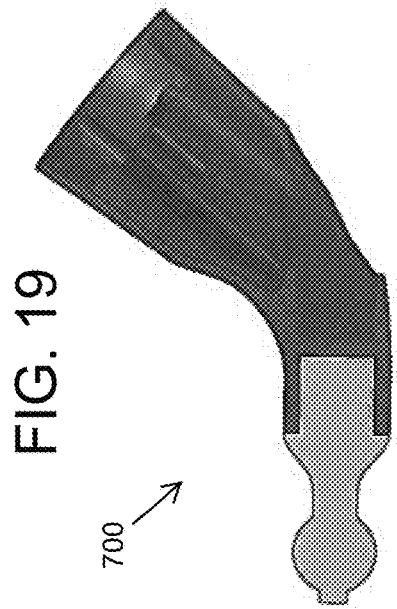
Figure 18:
Figure 20:
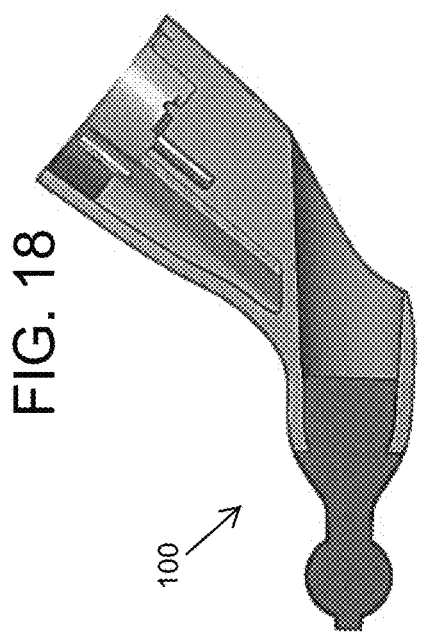

The illustrated mirror mount 10 may attach to a mounting bracket or structure, such as a vehicle header or an attachment element adhesively attached at an in-cabin surface of a windshield of the vehicle, via a non-circular twist-lock attachment 22, as shown in FIGS. 2 and 3, but may also be attached with a fastener, such as a threaded screw or bolt, an adhesive, or other conceivable attachment mechanism. The mirror, mirror mount or mount assembly, mounting bracket, and associated electrical components may utilize aspects of the assemblies, systems, and/or modules described in U.S. Publication No. US-2015-0251605, which is hereby incorporated herein by reference in its entirety.

The mirror stay or mount or mount assembly 100, as shown in FIGS. 4-10, includes at least two pieces, namely a mounting member 102 and an attachment member 104. The mounting member 102 is configured to provide a rigid connection with the vehicle interior mounting surface or structure, such as the header or the in-cabin surface of the windshield. The attachment member 104 is disposed at a lower portion or end 106 of the mounting member 102, and may be insert molded with the lower portion 106 of the mounting member 102, such that a pivot element 108 (such as a ball member) of the attachment member 104 may pivotally engage or adjustably attach a rearview mirror or mirror head 16 in the same or a similar manner to the pivotal connection of the mirror mount assembly 10 shown in FIG. 2. The mounting member 102 may comprise an injection molded member that is formed by injection molding a thermoplastic polymeric molding resin over a connection portion 110 of the attachment member 104 to form a rigid connection there between. As such, the attachment member 104 may comprise a different material from the mounting member 102, such as a die cast metal, allowing the mounting member 102 to be integrally formed with or at least partially incorporated with other molded components, such as a polymer mounting bracket or a portion thereof.

The connection portion 110 of the mirror attachment member 102 may be provided with an unsmooth surface, such as a knurled surface 112 (FIGS. 7-9), that may be overmolded by or press-fit into the lower portion 106 of the mounting member 102 to act as a retention feature that provides increased frictional resistance to sheer forces at the attachment interface between the connection portion 110 and the mounting member 102. It is also contemplated that the connection portion may be provided with other forms of retention features, such as at least one protrusion or indentation, to similarly engage the overmolded lower portion of the mounting member for improving the attachment interface between the connection portion of the attachment member and the mounting member.

With further reference to the mirror mount assembly 100 shown in FIGS. 4-10, the connection portion 110 of the mirror attachment member is substantially cylindrical shaped with the circumferential surface having the knurled texture 112. The connection portion 110 may also be slightly tapered to provide a shape that functions as a retention feature configured to limit or prevent disengagement of the attachment member 104 from the mounting member 102, such as from forces acting on the attachment member due to support and adjustment of the engaged rearview mirror head. Opposite the connection portion 110, the attachment member 104 includes a pivot element 108 at a distal end thereof, such as a socket or ball member. The pivot element 108 of the attachment member 104 is configured to pivotally engage a corresponding pivot element at the rearview mirror head. In the illustrated embodiment, the pivot element 108 of the attachment member 104 comprises a single ball member 114 having a spherical shape that is configured to insert at least partially into and engage a socket of the rearview mirror head. Such pivotal support and engagement allows the rearview mirror to be pivotally adjusted for viewing by a driver of the equipped vehicle. Also, the attachment member may include electrically conductive elements that, when the pivot element of the mount assembly is engaged with the mirror head, are configured to electrically connect to circuitry of the mirror head.

An intermediate portion 116 of the attachment member 104 may be defined between the spherical shape of the ball member 114 and the cylindrical shaped connection portion 110. The intermediate portion 116 shown in FIGS. 4-10 includes a cylindrical necked section 118 that protrudes from the ball member 116 to a conical section 120 that has a gradually increasing diameter from the necked section to the connection portion 110. A portion of the conical section 120 may have a greater diameter than the connection portion 110 to define a shoulder surface 122 that limits or prevents forward movement of the mirror attachment member 104 relative to the mounting member 102 and allows the exterior surface of the conical section 120 to have a flush and substantially uninterrupted surface transition to the outer surface of the lower end portion 106 of the mounting member 102. The substantially cylindrical shape of the connection portion 110 may also have a slightly narrowed or tapered diameter or slight angle toward the intermediate portion 116 to form a retention feature that provides a more secure connection with the lower portion of the mounting member 102, thereby limiting or preventing rearward forces on the attachment member from dislodging the attachment member from the lower portion of the mounting member.

Referring now to FIGS. 11-13, a mirror stay or mount or mirror mount assembly 200 includes a connection portion 210 of an attachment member 204 that has a conical shape, which is insert molded or overmolded at the lower portion 206 of the mounting member 202 to support and limit rearward disengagement of the attachment member 204. The pivot element 208 at the distal end of the attachment member, opposite the connection portion 110, is similarly provided with a ball member that is configured to pivotally engage a socket of the rearview mirror head. The intermediate portion 216 of the mirror attachment member 204, however, includes a substantially cylindrical shaped necked section 218 that protrudes from the ball member and extends to the connection portion 210 with a slightly narrowed diameter proximate the connection with a conical shape of the connection portion 210. The lower portion 206 of the mounting member 202 is insert molded or overmolded at or over the conical shape of the connection portion 210 and over a portion of the necked section 218, where the lower portion 206 narrows, thins, and/or diminishes to provide a flush and substantially uninterrupted surface transition between the attachment member 204 and the outer surface of the lower portion of the mounting member 202. The conical shape of the connection portion 210 thereby provides a retention feature to limit disengagement of the attachment member from the mounting member. It is also contemplated that the connection portion may also be provided with other retention features, such as surface protrusions or an unsmooth surface, such as a knurled surface, that is overmolded by the lower end portion of the mounting member to provide increased frictional attachment to the mounting member 202.

With reference to the mounting member 202 of the mirror mount assembly 200 shown in FIGS. 11-13, a lower portion 206 of the mounting member 202 extends at an angle rearward from the upper portion and is insert molded over the connection portion of the attachment member 204. The lower portion of the mounting member 202 may also be formed with a hollow interior section or passageway 224, as shown in FIG. 13, which provides access to an interior area of the attachment member 204 or to an electrical connector on the attachment member 204. Accordingly, after the mounting member 202 is molded over or otherwise secured or formed with the mirror attachment member 204, electrical wires may extend through the interior of the mounting member 202 to be electrically connected to or provided through the attachment member, such as to the distal end of the pivot element, for electrical connection with circuitry and/or components of the rearview mirror. The hollow interior 124 may also extend upward in the mounting member 102, as shown in FIGS. 7-10 and 18, to provide a channel or passageway that allows an electrical wire to extend entirely through the mounting member to also electrically connect to circuitry of the rearview mirror head, thereby effectively housing and concealing a portion of the electrical wire or wires. Optionally, the pivot element of the mirror attachment member may be configured to electrically connect to circuitry of an engaged rearview mirror head, such that electrical connection may be established between the vehicle wires or wire harness and circuitry of the rearview mirror head by attaching the wire or wires to the mirror attachment member, such as within the interior area of the mounting member, when the mirror attachment member is attached at the vehicle and/or when the mirror head is attached at the mirror attachment member.

A hollow interior section of the mounting member may alternatively be only provided proximate the upper end portion of the mounting member to allow fasteners to engage the mounting member and also to reduce the weight of the mounting member where the structure is sufficient to provide a secure and rigid connection with the interior structure of the vehicle, such as the header or the in-cabin surface of the windshield. The hollow interior section may also be accessed from an aperture, such as an access aperture 226 shown in FIGS. 11-13, in the front side of the mounting member. This access aperture may be used to insert tools, such as screw drivers, that are used to engage one or more fasteners that may be used to secure the mounting member to the interior attachment surface or structure of the vehicle. The access aperture may additionally or alternatively used to feed electrical wires to and/or through the attachment member, such as into engagement with an electrical connector, such as shown in FIG. 2.

In addition to illustrating various configurations of hollow interior sections or passageways of mounting members and differently shaped attachment interfaces between mirror attachment members and mounting members, FIGS. 14-21 also illustrate different exterior shaped mounting members of mirror mount assemblies 100, 200, 300, 400, 500, 600, and 700. In each embodiment, the lower portion of the mounting member angles rearward from the upper portion, such as at a substantially right angle as shown in the mirror mount assembly 300 of FIGS. 14 and 15 or at a lesser angle, such as about forty-five degrees or less as shown in the mirror mount assembly 600 of FIG. 18. However, it is contemplated that additional embodiments may have a larger rearward angle or may not be angled, and instead may be linear or curved, between the upper and lower portions and/or may have a different exterior shape and surface contour.

The mirror attachment member may comprise any suitable material, such as a metallic material, for example a die cast metal (such as, for example, zinc or other suitable metal) or the like. The mounting member may include a molded polymeric member, such as formed by injection molding of a polymeric material or resin, such as a reinforced polyamide polymeric resin. The preferred material for injection molding of the mounting member according to one embodiment is RENY™ polymeric molding resin available from Mitsubishi Engineering Plastics Corporation, Japan. RENY™ comprises a thermoplastic polymeric molding compound based on mainly polyamide MXD6 that has been reinforced with glass fiber, carbon fiber and/or minerals and has generally superior mechanical strength and modulus compared with other engineering plastics so as to be suitable as a metal substitute but with lighter weight than metal. Optionally, other thermoplastic injection-moldable engineering plastics such as glass and/or mineral filled polyamides (nylon) or polycarbonate or acrylonitrile butadiene styrene (ABS) or a glass fiber polypropylene or the like can be used. Furthermore, the mounting member may be formed of a polymeric material, such as an engineering plastic or the like, and may be formed by injection molding. Examples of suitable engineering plastics include Ultra-high-molecular-weight polyethylene (UHMWPE), Nylon 6, Nylon 6-6, Acrylonitrile butadiene styrene (ABS), Polycarbonates (PC), Polyamides (PA), Polybutylene terephthalate (PBT), Polyethylene terephthalate (PET), Polyphenylene oxide (PPO), Polysulphone (PSU), Polyetherketone (PEK), Polyetheretherketone (PEEK), Polyimides, Polyphenylene sulfide (PPS), Polyoxymethylene plastic (POM/Acetal), and/or blends/combinations thereof. Engineering plastics typically have high strength and have mechanical properties akin to those of metal. Thus, the mounting member may comprise a strong molded member that has attaching portions, fastener bosses, and the like integrally or unitarily molded together so as to provide a unitary injection molded mounting member. It is also contemplated that additional components, such as a camera mounting bracket or other suitable bracket may be integrally or unitarily molded with the mounting member so as to provide a unitary injection molded piece.

Optionally, the mirror attachment member may comprise a molded polymeric material with a polished surface to provide enhanced pivotal movement of the mirror head at the pivot joint. For example, the pivot element or member may be molded at a higher temperature (such as at greater than about 250 degrees F. as compared to typical molding temperatures of around 180 degrees F.) or may be cooled at a higher temperature. Because the temperature is preferably greater than about 250 degrees F., cooling may be achieved via use of oil, pressure or other cooling fluids other than water. By molding the polymeric pivot element or member in this manner, the glass filler (such as for a material having about 60 percent glass fiber), the glass (or other filler) is kept away from the outer surface of the ball member to provide a smooth outer ball surface of the pivot member. Optionally, the mounting member may be integrally molded with the attachment member or may be overmolded or molded in a two shot molding process to achieve the desired mounting stay strength and desired outer ball surface.

Changes and modifications to the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
   a mirror head comprising a mirror casing and a reflective element;
   a mounting member having an upper portion configured to mount at an interior portion of a vehicle;
   an attachment member having a connection portion and a pivot element;
   wherein said attachment member is disposed at a lower portion of said mounting member;
   wherein said mirror head is configured to adjustably attach at said pivot element;
   wherein said mounting member comprises a polymeric material, and wherein at least said connection portion of said attachment member comprises a metallic material, and wherein said connection portion of said attachment member is insert molded in said lower portion of said mounting member; and
   wherein said connection portion of said attachment member includes a conical shape that is overmolded at said lower portion of said mounting member to limit disengagement of said attachment member from said mounting member.

2. The interior rearview mirror assembly of claim 1, wherein said pivot element of said attachment member comprises a metallic material.

3. The interior rearview mirror assembly of claim 1, wherein electrically conductive elements of said attachment member are configured to electrically connect to circuitry of said mirror head.

4. The interior rearview mirror assembly of claim 3, wherein said mounting member comprises a hollow passageway and is configured to at least partially conceal an electrical wire that extends through said passageway to said pivot element of said attachment member for electrically connecting to circuitry of said mirror head.

5. The interior rearview mirror assembly of claim 1, wherein, when said mounting member is mounted at the interior portion of the vehicle, said lower portion of said mounting member is angled rearward from said upper portion of said mounting member and away from a vehicle windshield.

6. The interior rearview mirror assembly of claim 1, wherein said attachment member comprises a die cast metal, and wherein said pivot element of said attachment member comprises a ball member configured to pivotally attach at a socket of said mirror head.

7. The interior rearview mirror assembly of claim 1, wherein said connection portion of said attachment member includes a knurled surface that is received at said lower portion of said mounting member.

8. The interior rearview mirror assembly of claim 1, wherein said upper portion of said mounting member is configured to mount to at least one of a header portion of the vehicle and an attachment element adhesively attached at an in-cabin surface of a windshield of the vehicle.

9. An interior rearview mirror assembly for a vehicle, said interior rearview mirror assembly comprising:
a mounting member having an upper portion configured to mount at an interior surface of a vehicle and a lower portion angled from said upper portion, such that, when said mounting member is mounted at the interior surface of the vehicle, said lower portion is configured to protrude generally rearward relative to the vehicle;
an attachment member disposed at said lower portion of said mounting member, said attachment member having a pivot element protruding from said lower portion of said mounting member for pivotally attaching at a rearview mirror head;
wherein said mounting member and said attachment member comprise different materials;
wherein said attachment member includes a connection portion with a retention feature, and wherein said connection portion is insert molded at said lower portion of said mounting member, and wherein said retention feature is configured to limit disengagement of said attachment member from said mounting member; and
wherein said retention feature of said connection portion comprises a conical shape that is overmolded at said lower portion of said mounting member.

10. The interior rearview mirror assembly of claim 9, wherein one of said mounting member and said attachment member comprises a polymeric material, and wherein the other of said mounting member and said attachment member comprises a metallic material, and wherein said metallic material is insert molded in said polymeric material.

11. The interior rearview mirror assembly of claim 9, wherein said attachment member comprises a die cast metal, and wherein a connection portion of said attachment member is received at said lower portion of said mounting member.

12. The interior rearview mirror assembly of claim 11, wherein said mounting member comprises a reinforced polyamide polymeric material.

13. The interior rearview mirror assembly of claim 9, wherein said pivot element of said attachment member comprises a ball member configured to pivotally attach at a socket of the rearview mirror head.

14. The interior rearview mirror assembly of claim 9, wherein said attachment member comprises a die cast metal, and wherein said retention feature of said connection portion comprises a knurled surface that is overmolded at said lower portion of said mounting member.

15. An interior rearview mirror assembly for a vehicle, said interior rearview mirror assembly comprising:
a mirror head comprising a mirror casing and a reflective element;
a mounting member comprising a polymeric material and having an upper end configured to mount at at least one of a header portion of a vehicle and an in-cabin surface of a windshield of a vehicle, said mounting member having a lower end extending downward and rearward from said upper end;
a pivot element comprising a die cast metal and having a connection portion received in said lower end of said mounting member, said pivot element having a distal end protruding rearward from said connection portion and configured to pivotally attach at said mirror head;
wherein said connection portion of said pivot element is insert molded in said lower portion of said mounting member;
wherein said distal end of said pivot element comprises a ball member pivotally attached at a socket of said mirror head, and wherein said connection portion of said pivot element comprises a retention feature that is received in said lower end of said mounting member to limit disengagement of said pivot element from said mounting member; and
wherein said retention feature of said connection portion comprises a conical shape that is overmolded at said lower portion of said mounting member.

16. The interior rearview mirror assembly of claim 15, wherein said mounting member has a substantially hollow passageway for providing an electrical wire to said distal end of said pivot element for electrical connection to circuitry of said mirror head.

* * * * *